D. M. BERNOTOW.
MACHINE FOR SETTING UP AND FOLDING CARTONS.
APPLICATION FILED JUNE 23, 1919.
1,378,580.
Patented May 17, 1921.
7 SHEETS—SHEET 2.
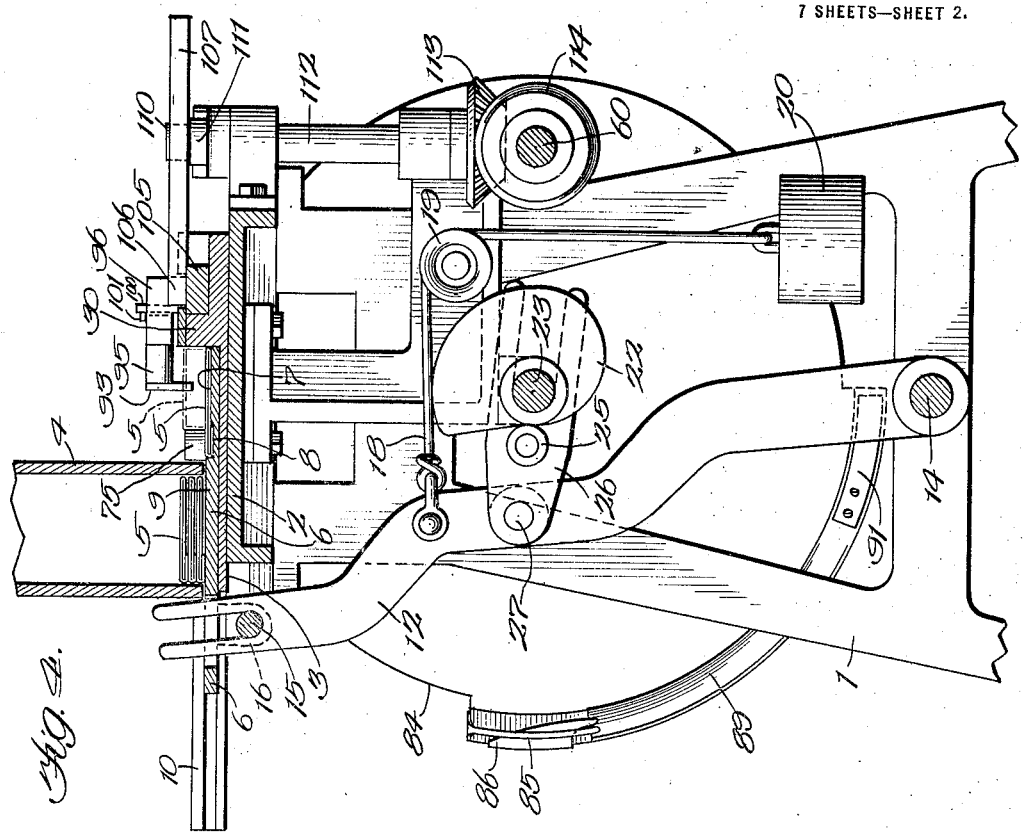
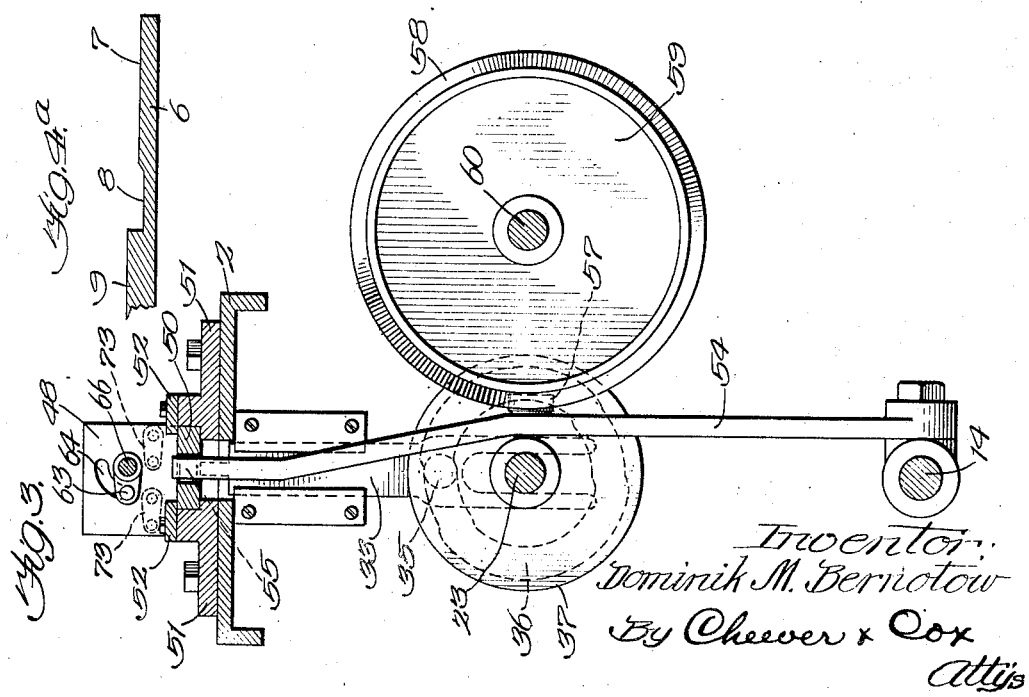

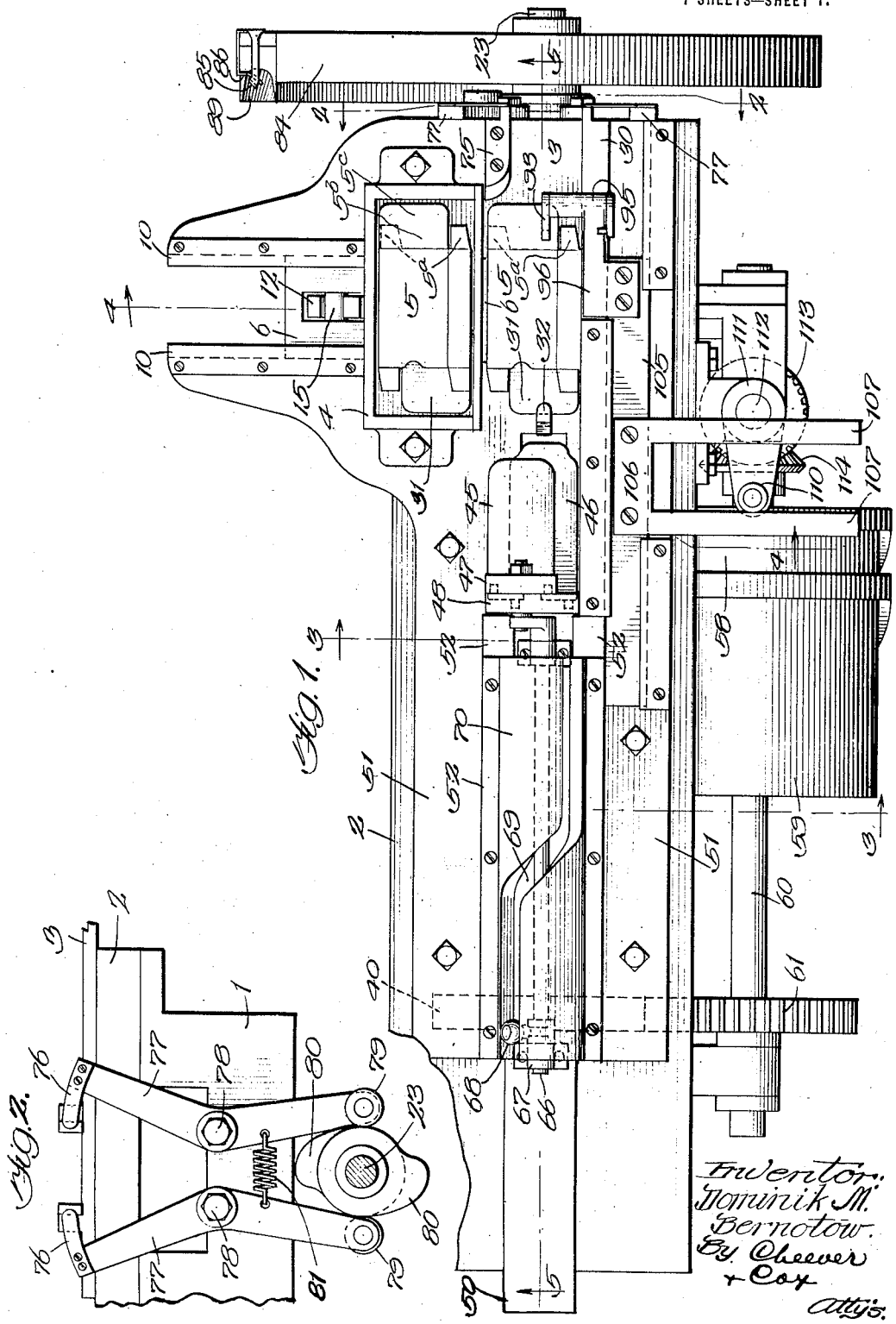

D. M. BERNOTOW.
MACHINE FOR SETTING UP AND FOLDING CARTONS.
APPLICATION FILED JUNE 23, 1919.
1,378,580.
Patented May 17, 1921.
7 SHEETS—SHEET 3.
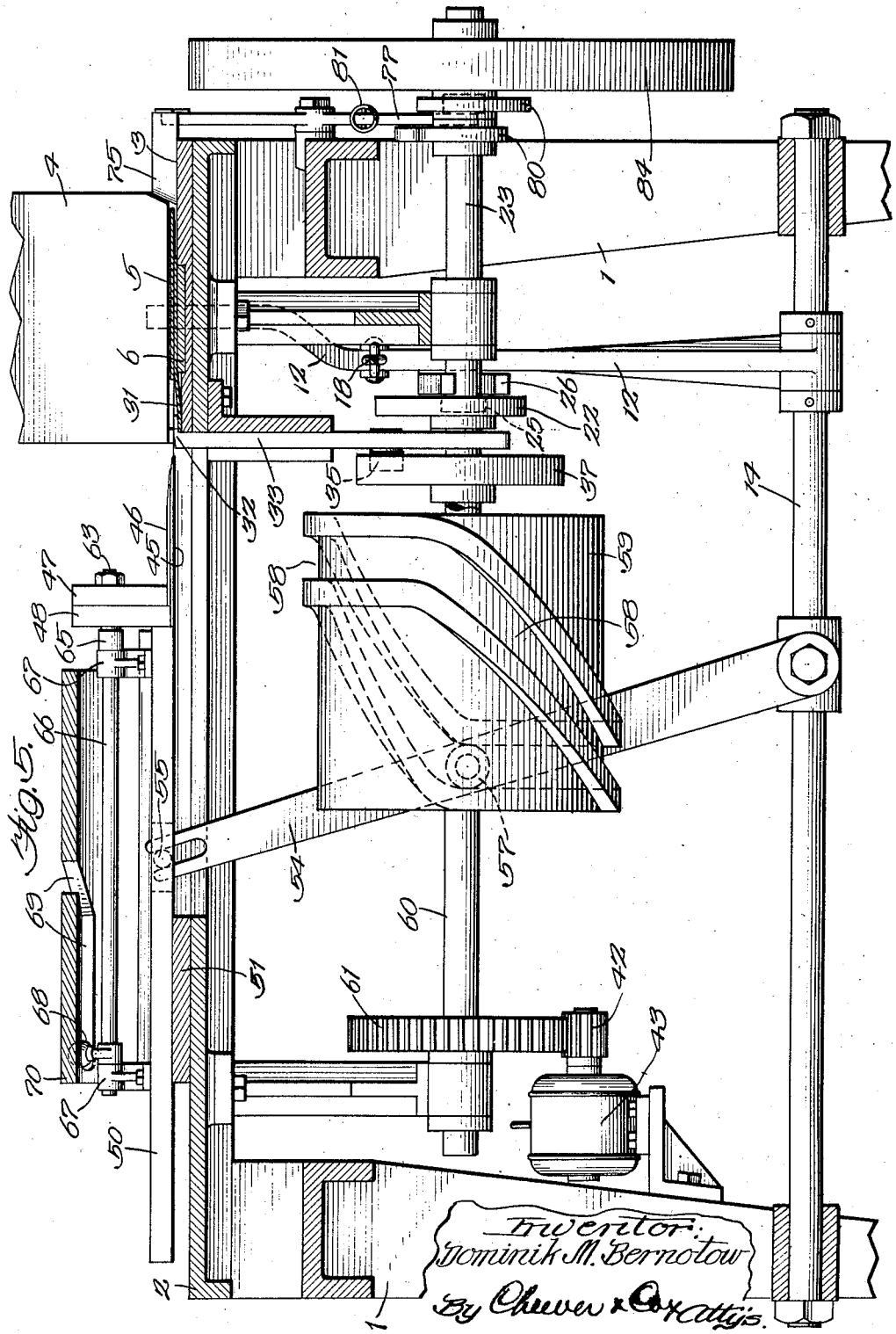

D. M. BERNOTOW.
MACHINE FOR SETTING UP AND FOLDING CARTONS.
APPLICATION FILED JUNE 23, 1919.
1,378,580.
Patented May 17, 1921.
7 SHEETS—SHEET 4.
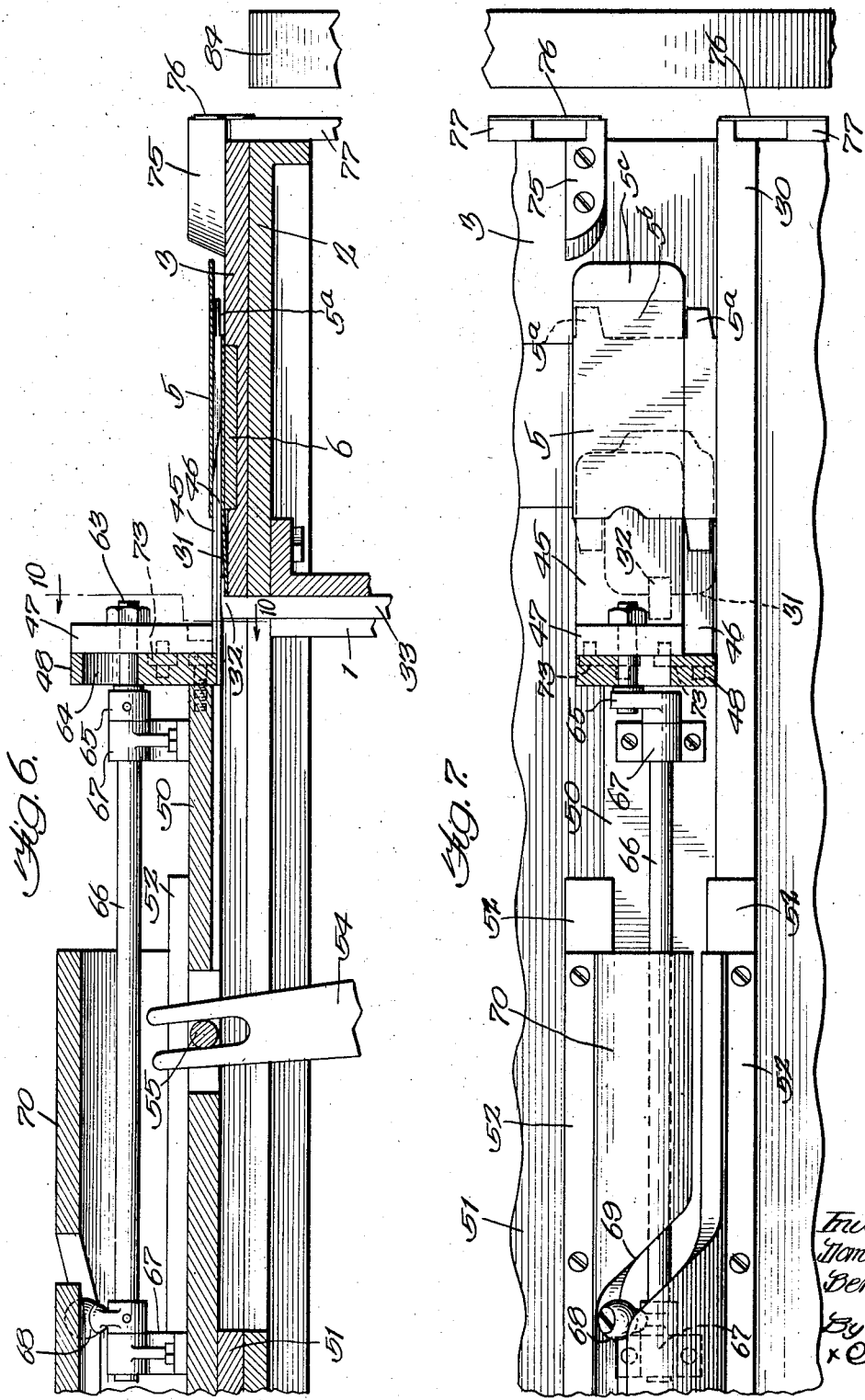

D. M. BERNOTOW.
MACHINE FOR SETTING UP AND FOLDING CARTONS.
APPLICATION FILED JUNE 23, 1919.
1,378,580.
Patented May 17, 1921.
7 SHEETS—SHEET 5.
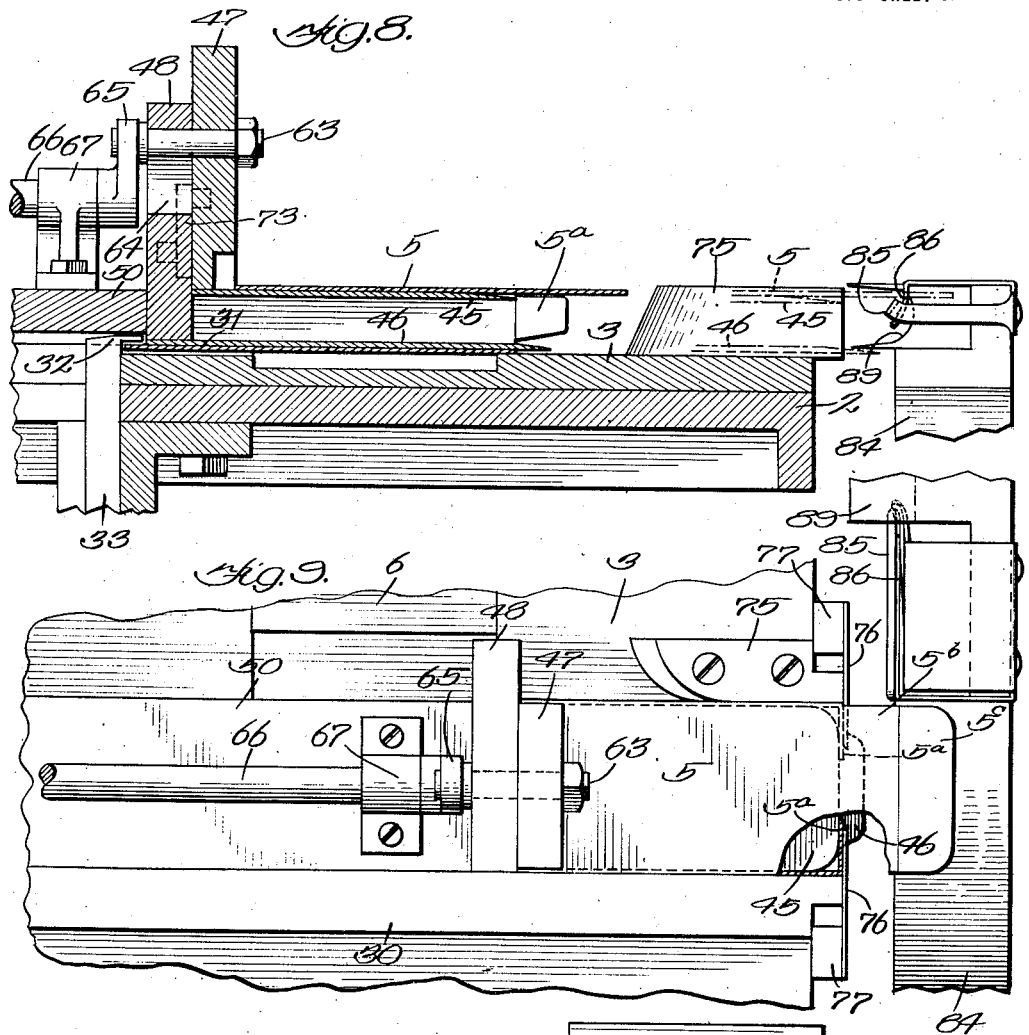
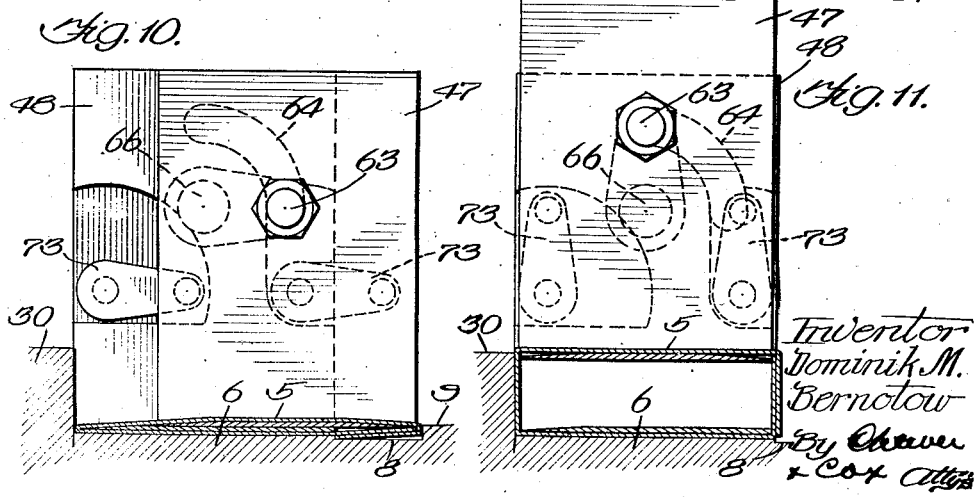

D. M. BERNOTOW.
MACHINE FOR SETTING UP AND FOLDING CARTONS.
APPLICATION FILED JUNE 23, 1919.
1,378,580.
Patented May 17, 1921.
7 SHEETS—SHEET 6.
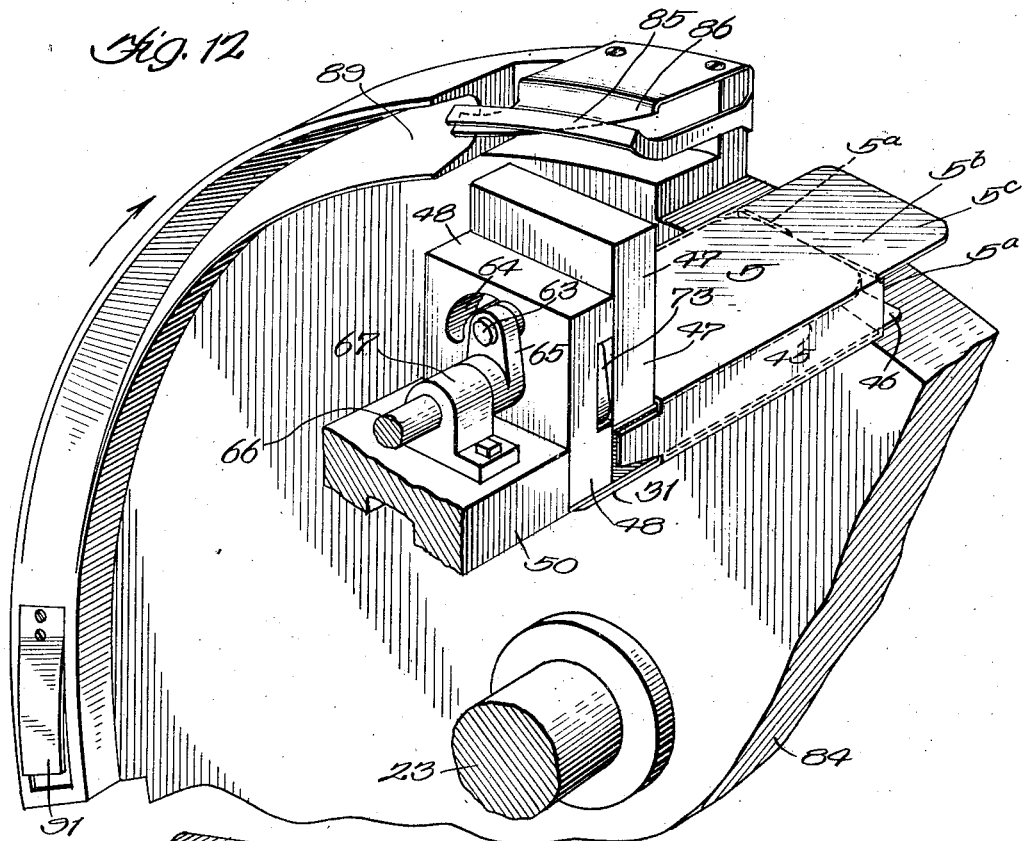
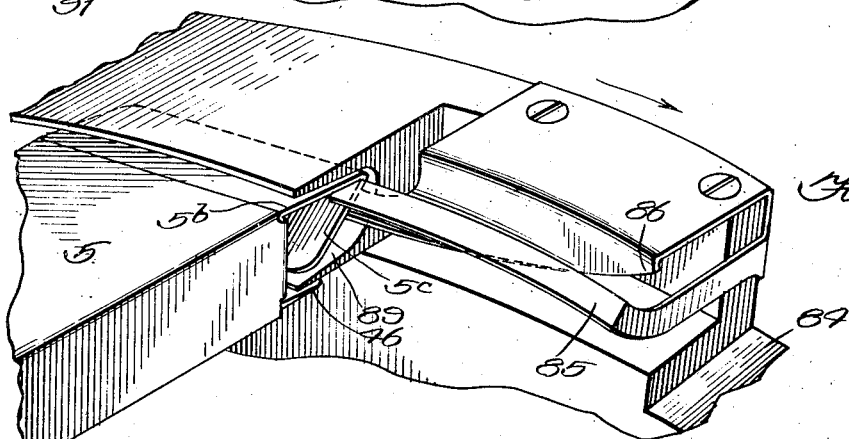
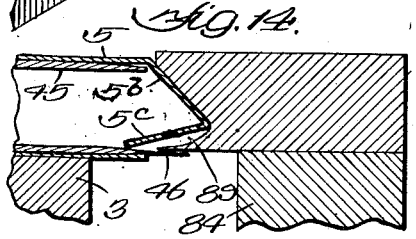 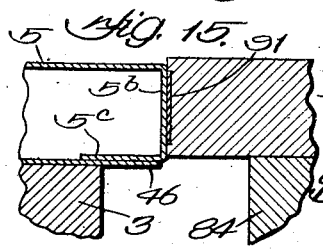

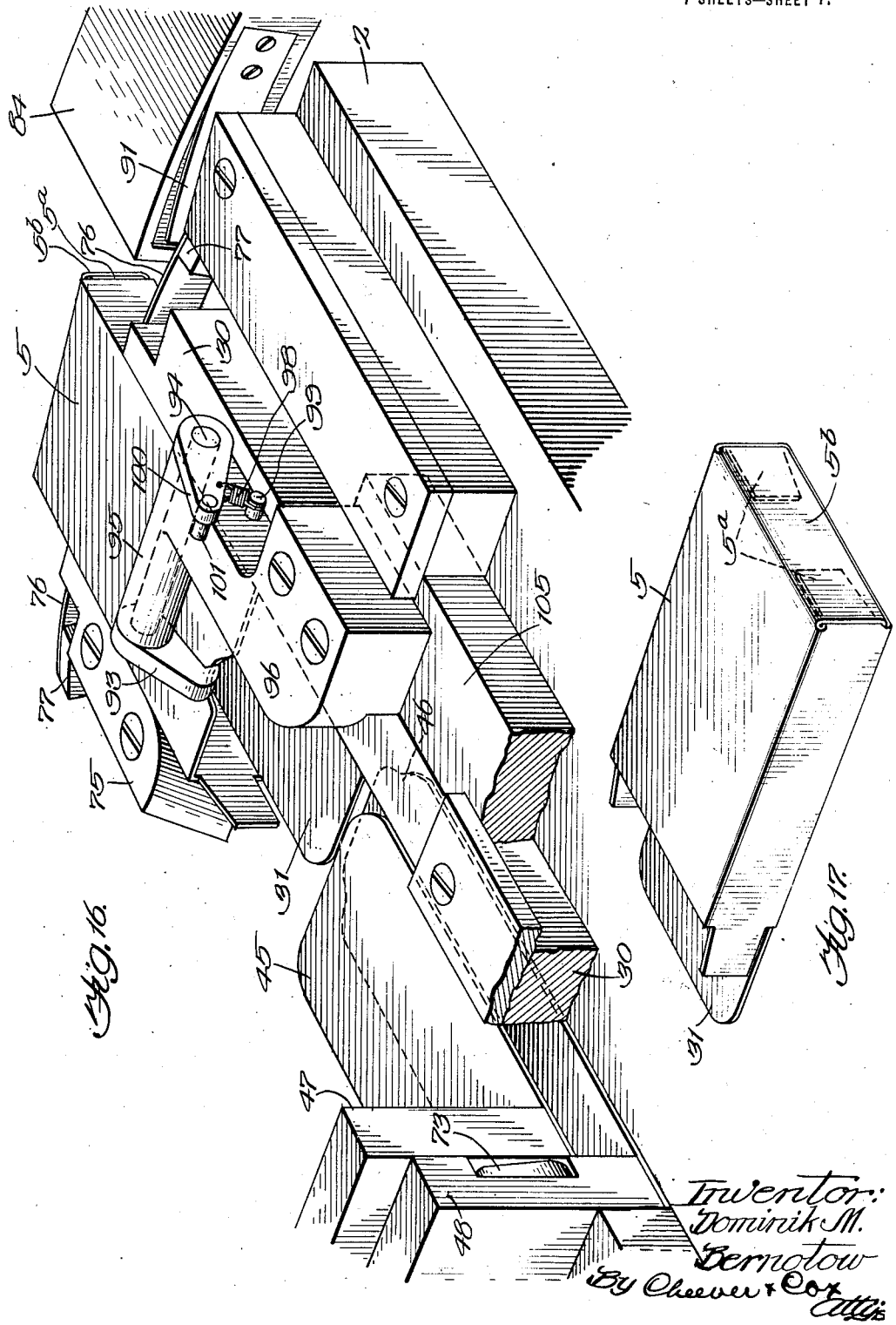

UNITED STATES PATENT OFFICE.

DOMINIK M. BERNOTOW, OF CHICAGO, ILLINOIS, ASSIGNOR, BY MESNE ASSIGNMENTS, TO BUNTE BROTHERS, OF CHICAGO, ILLINOIS, A CORPORATION OF ILLINOIS.

MACHINE FOR SETTING UP AND FOLDING CARTONS.

1,378,580.        Specification of Letters Patent.      Patented May 17, 1921.

Application filed June 23, 1919. Serial No. 306,039.

*To all whom it may concern:*

Be it known that I, DOMINIK M. BERNOTOW, a citizen of the United States, residing at Chicago, in the county of Cook and State of Illinois, have invented a certain new and useful Improvement in Machines for Setting Up and Folding Cartons, of which the following is a specification.

This invention relates to machines for setting up cartons, pasteboard boxes, and the like, and in the instance illustrated in the drawings is adapted to set up cartons of the size and shape commonly employed for dispensing cough drops, hard candies, pastils, gum and similar goods.

The general object of the invention is to provide a machine capable of receiving cartons in a magazine or hopper and delivering them one at a time to a mechanism which automatically and in a positive manner "squares" the cartons, infolds the side flaps and end flaps thereof, and finally ejects the carton from the machine. The present machine belongs to the same class as the one shown in copending application filed July 12, 1918, Serial No. 244,538. The general object is accomplished by a number of combinations and subcombinations of coöperating elements which will be described in detail. As a brief preliminary statement may facilitate an understanding of the principle of the invention, it may be stated that in the form shown in the accompanying drawings, the flat cartons are first piled by the operator in a suitable magazine or hopper. This is open at the bottom and at suitable intervals a slide at the bottom of the magazine transfers the carton at the bottom of the pile onto an operating table. Thereupon the rear end flap of the carton is engaged by a finger which descends upon it and holds the carton in position. The carton is then "squared" by positive acting mechanism which includes two thin squaring plates. At first, the upper squaring plate is down in contact with the lower one and hence their noses readily enter the rear open end of the flat carton. Soon after they have entered the cartons the upper plate commences to rise and at the same time swing transversely upon an arc having a radius equal to the height of the sides of the carton. The squaring plates continue to advance until the blocks upon which they are mounted engage the rear end of the carton whereupon the finger releases the rear end flap so that the blocks may advance the carton to a position where its side and end flaps are to be folded. As soon as the carton has arrived at this advanced station, the fingers move from the side and fold the side flaps of the carton into position parallel with the forward end of the carton. A cam wheel thereupon comes into action and first bends or "breaks" the end flap along the creased line thereof, then points the outer section of the end flap toward the carton after which a folding and tucking cam swings the two sections of the end flap into the carton. By preference a final touch is imparted to the flaps by a resilient wiper cam which insures proper positioning. After this has been accomplished, the cam wheel rotates the folding and tucking mechanism out of the way and ejecting mechanism comes into play which slides the finished carton off the operating table into a waiting receptacle. Contributory objects of the invention deal with the various means for producing these different operations. The invention also includes the provision of certain refinements which contribute to the certainty of operation of the machine.

According to a design selected to explain the principle of the invention,—

Figure 1 in the accompanying drawings is a plan view of the complete machine.

Fig. 2 is a sectional detail taken on the line 2—2, Fig. 1. This shows principally the mechanism which folds the side flaps into position.

Fig. 3 is a sectional detail taken on the line 3—3, Fig. 1 and shows, among other things, the mechanism for actuating the squaring plates.

Fig. 4 is a sectional elevation on the line 4—4, Fig. 1.

Fig. 4ª is a fragmentary view in section showing a portion of the slide which transfers the flat cartons from the magazine to the operating table.

Fig. 5 is a sectional elevation taken longitudinally chiefly on the line 5—5, Fig. 1.

Fig. 6 is an enlarged view of the parts shown in the upper portion of Fig. 5. The parts are shown in changed position.

Fig. 7 is a plan view of the parts shown in Fig. 6.

Fig. 8 shows a changed position of the mechanism shown in Fig. 5. This in full lines shows the carton after it is open or "squared." The dotted lines in this figure show the carton advanced to the folding station ready to have the flaps folded.

Fig. 9 is a plan view of the parts shown in Fig. 8, but showing the squaring plates and pusher blocks in their extreme forward position and the carton in the position shown in dotted lines in Fig. 8.

Fig. 10 is a sectional elevation taken on the line 10—10, Fig. 6, and showing the squaring plates and their supporting blocks in the position they occupy when the carton is starting to open or becomes squared.

Fig. 11 shows a changed position of the parts illustrated in Fig. 10.

Fig. 12 is a perspective view showing the cam wheel and associated parts.

Fig. 13 is an enlarged view of some of the parts shown in Fig. 12, particularly the first folding cam and the anvil with which it coöperates, and the advanced portion of the grooved tucker cam.

Figs. 14 and 15 are sectional details illustrating the progress of the end flap as it moves home to final position.

Fig. 16 is a perspective view of a portion of the ejecting mechanism as well as other adjacent parts of the machine.

Fig. 17 is a perspective view of the carton after it has been set up.

Like numerals denote like parts throughout the several views.

In the form shown, the machine has a main frame 1 having a flat top 2 on which is mounted an operating table 3. At a convenient point at one side of the operating table is a magazine or hopper 4 in which the operator piles the flat cartons 5 in the form in which they are delivered by the manufacturer. The magazine is open at the bottom and the pile rests upon a slide 6. This slide, as shown in detail in Fig. 4ª has a depressed portion 7 with a pocket 8 for receiving the extra thickness of material at one side of the carton. The slide also has a raised portion 9 which forms a cut-off. The action is such that as the slide reciprocates back and forth it will deliver, each time, the bottom one of the pile of cartons.

The slide reciprocates in guides 10 and is actuated by a lever 12 best shown in Figs. 4 and 5. This lever is fulcrumed at its lower end upon a stationary rod 14 and is bifurcated at its upper end to receive a pin 15 fastened to lugs 16 formed on the bottom of the slide. The slide is urged toward delivering position by means of a cord 18 passing over an idler sheave 19 to a counterweight 20. The lever is forced in the opposite direction by means of a cam 22 rigidly fastened upon the main shaft 23, said cam engaging an anti-friction roller 25 mounted upon the side of a forked link 26. The said link is pivoted to lever 12 by means of a pin 27. The branches of this link receive the main shaft between them and hence the free end of the link is supported and guided by said shaft. It will be noted that the cam makes only one way engagement with the roller and operates positively in only one direction. The result is that if a carton jams in the magazine or in the slide 6 at the bottom of it, it will not be crushed because the pressure of the slide against it will be only that produced by the counterweight 20. It may be said therefore that the movement of the slide in the delivering direction will not be positive but will be yielding and the only positive movement will be in the return direction under the influence of the cam 22. As the cam surface recedes, the roller 25 is kept in contact with it only through the action of gravity upon counterweight 20.

As soon as the flat carton has been delivered onto the operating table with its forward edge in contact with the gage strip 30, its rear end flap 31 is engaged by a finger 32 shown in plan in Fig. 1 and in side elevation in Figs. 5, 6 and 8. Said finger is formed at the upper end of a vertically reciprocating rod 33, a face view of which is shown in Fig. 3. This rod is bifurcated at its lower end to slidingly engage and be guided by the main shaft 23. Mounted on one face of rod 33 is an antifriction roller 35 which works within the track 36 of a shrouded cam 37 rigidly fastened to shaft 23. When the cam rotates it moves the finger up and down in proper timed relation, the cam having a suitable dwell to hold the finger shown in acting position when the carton is being "squared" and another dwell to hold the finger up when the carton is being moved forward and a fresh one is being delivered onto the table.

The main shaft previously mentioned is located approximately in the median vertical plane of the machine and is driven, according to the present design, by a gear wheel 40 shown in dotted lines in Fig. 1. This gear wheel meshes with a pinion 42 secured to the shaft of an electric motor 43, the latter being shown in Fig. 5. It will be understood, however, that power may be derived from any other suitable source.

As stated, the carton arrives on the operating table "in the flat" and upon its arrival is held by gage strip 30 and the finger 32. It is now ready to be "squared," and this is accomplished by means of two squaring plates 45, 46. These are shown in top plan view in Figs. 1 and 7 and in perspective in Figs. 12 and 16. The upper plate 46 is fastened to the bottom of a block 47 while the lower one is fastened to the bottom of a block 48. The block 48 is fastened at the forward end of a slide 50 which reciprocates longitudinally and is held between guides 51, 51 and plates 52, 52 as shown in cross-sectional detail in Fig. 3. The mechanism for reciprocating the slide 50 is shown in Figs. 3, 5 and elsewhere and consists of a lever 54, the bifurcated upper end of which engages a pin 55 fastened to the slide. At its lower end said lever is fulcrumed upon the rod previously mentioned. Between its ends said lever has an anti-friction roller 57 which works within a cam groove 58 formed upon the cylindrical surface of a drum 59 rigidly fastened to countershaft 60. Said countershaft is parallel to the main shaft 23 and is driven by a gear wheel 61 which meshes with the gear wheel 40 previously mentioned. The cam groove is so formed as to reciprocate the slide 50 in timed relation with other parts of the mechanism as elsewhere herein appears.

The squaring plates 45 and 46 are preferably rounded and thinned at their forward ends to facilitate their entrance into the rear end of the carton and this action is rendered especially sure by reason of the fact that the finger 32 holds the rear edge of the end flap down below the level of the bottom of the lower plate 45 as best shown in Figs. 5 and 6. In other words, the end flap is held in a slanting position by the finger so that the end flap itself tends to guide the squaring plates safely into the end of the carton.

As stated, when the squaring plates first enter the carton the upper one is down in contact with the lower one, although it is off-set (in the present case toward the left looking in the direction of the progress of the carton through the machine). After the noses of the squaring plates have entered the carton, the upper plate commences to swing upward and toward the right, which causes the top of the box to rise and swing over toward the right so as to lie squarely above the bottom of the carton. The mechanism for accomplishing this upward and sidewise swing of the upper plate is shown, among other places, in Figs. 1 and 5 to 11. Block 47 is supported upon a stud 63 which passes through an arcuate slot 64 in block 48 to the end of a crank arm 65 fastened at the forward end of a rock shaft 66. Said rock shaft is journaled in bearings 67, 67 mounted upon slide 50. The shaft is rocked by means of a lever 68 which works within a cam slot 69 formed in a stationary housing 70. The slot is so configurated that during the first portion of the forward movement of the squaring plates, the said two plates will lie in contact with each other and then after they have entered the carton, the upper plate will swing upward and sidewise and finally the two plates will move forward, with one above the other, to push the carton forward to advanced position where the side and end flaps will be folded in. It may be said, therefore, that the housing 70 has a cam slot having an actuating portion preceded and succeeded by a dwell portion.

Figs. 10 and 11 show in detail the mechanism for keeping the upper plate 46 horizontal while it is swinging upward and toward the right. As these views are taken looking toward the left in Fig. 1 the movement appears to be upward and to the left. Links 73, 73 are pivoted at one end to block 48 and at the other end to block 47. Hence when the stud 63 moves upward and sidewise the block 47 will maintain its upright position.

After the box has been "squared" it is advanced to the folding station by the block 47 which, in addition to its duties in operating the upper plate 46, acts as a pusher block to advance the carton to the second operating station where the flaps are folded in. Block 47 is shown in engagement with the rear edge of the carton in Figs. 8 and 9. To steady the carton while the end flaps are being tucked in, a gage or guide block 75 is provided on the side of the operating table opposite to the strip 30. After the carton has arrived at this advanced position the side flaps 5ª of the carton are folded inward by fingers 76, 76, entering transversely from opposite sides, as shown in plan detail in Figs. 7 and 9. In the present case these fingers consist of flat strips of metal mounted at the upper end of levers 77. These parts are shown in perspective in Fig. 16 and in more complete detail in Fig. 2. The levers are fulcrumed upon stationary pins 78 and at their lower ends carry anti-friction rollers 79 which engage two similar but oppositely placed cams 80, 80 rigidly fastened to the main shaft 23. The fingers are held in retracted position by means of a spring 81 which is a tension spring fastened to levers 77 and tends to hold the rollers 79 in contact with their respective cams. These parts are also shown at the right end of Figs. 1 and 5.

The end flap of the carton consists of an inner section 5ᵇ and an outer section 5ᶜ, (as shown in Fig. 9 and elsewhere).

By the time that the side flaps have been folded in, the end flap is contacted by a cam wheel 84 which is rigidly fastened to the main shaft 23, and has, among other things, an arm 85 adapted to coöperate with a cam 86. Arm 85 is arcuate and concentric with the wheel and forms what may be regarded as an "anvil" for holding the end flap while the cam 86 is folding the outer section 5ᶜ downward and backward as illustrated in Fig. 13. It will be understood that ordinarily the end flap of the carton is creased by the manufacturer to facilitate bending of the outer section 5ᶜ relatively to the inner section 5ᵇ. The parts are so proportioned that anvil 85 engages the inside of the end flap at the crease. As the cam wheel revolves toward the right (Figs. 12 and 13) it brings a cam groove 89 into action, this groove receiving the end flap after the parts 85 and 86 have acted upon it. This groove gradually becomes shallower as shown in Fig. 12 and is so configurated that the end flap will be gradually pushed into the end of the carton. This action is illustrated progressively in Figs. 14 and 15. It will be noted by referring to Figs. 13 to 15 that the lower squaring plate 46 at this time projects under the lower lip of the grooved tucking cam 89. Consequently the section 5ᶜ of the end flap readily slides into position as it rides on top of the plate. Thus the lower squaring plate also serves as a guide for the advance edge of the end flap when the end flap is being tucked into the end of the carton. It will also be noted, especially by reference to Fig. 14, that while this tucking operation takes place the upper squaring plate 45 serves as a support for the top of the carton.

At the final end of the groved cam 89 is a wiper cam 91 shown in perspective in Fig. 12. This is in the form of a leaf spring and serves to give the end flap of the carton a final push to make certain that it is completely closed before the carton is ejected from the machine.

After the flaps have thus been infolded, the carton is ejected by mechanism shown more particularly in Figs. 1, 4 and 16. This mechanism has a dog 93 adapted to engage the rear edge of the top of the carton as shown in Fig. 16. This dog is mounted upon a rock shaft 94 journaled in a hub 95 formed upon a block 96. The dog is constantly urged to acting position by means of a tension spring 98, the lower end of which is fastened to a pin 99 on the block and the upper end to an arm 100 fastened to the rock shaft. Said arm 100 has a stop pin 101 adapted to engage the top of block 96 to limit the movement of the arm and dog. The nose of the dog is cam shaped so that it will ride up over the top of the carton when the latter passes under it. The block 96 is fastened to the top of a sliding bar 105 which travels longitudinally and is reciprocated by the mechanism best shown in Figs. 1 and 4. A fork 106 having two branches 107, 107 is fastened to the top of bar 105 and extends to one side of the machine. An anti-friction roller 110 is mounted upon the outer end of an arm 111 which is fastened to the upper end of a vertical shaft 112. Said shaft is rotated by means of a bevel gear 113 meshing with a similar gear 114 fastened to countershaft 60. As the branches of the fork are at some distance apart, it follows that although the shaft 112 rotates uniformly the dog will reciprocate intermittently; and the parts are so timed that the dog will not tend to move the carton off the operating table until the infolding of the flaps is completed.

The operation of the machine will now be apparent. The slide 6 delivers the flat cartons one at a time on to the operating table 3, after which the finger 32 engages the rear end flap and holds it down in a slanting position so that the squaring plates 45, 46 will have no difficulty in entering the rear end of the carton. The squaring plates after they have moved forward a short distance into the carton commence to "square" the latter, the upper plate 45 swinging upward and sidewise under the action of the cam slot 69. After the carton has been squared, the advancing block 47 on which the upper squaring plate 45 is mounted engages the rear end of the carton and pushes it to the advanced position, shown in Fig. 9. The side fingers 76 then move inward and fold the side flaps inward as shown in Fig. 9. Thereupon the rotating cam wheel 84 brings the coöperating elements 85, 86 into engagement with the end flaps, bending the outer section 5ᶜ downward and backward so it may be received within the cam groove 89. The progress of this groove forces the end flap into closed position after which the cam 91 imparts a final touch to it. The continued rotation of the cam wheel then moves the cam 89 out of the way whereupon the ejector dog 93 engages the top of the box and slides it off of the operating table where it may be caught by any suitable receptacle.

From the foregoing it will be evident that the machine is not only entirely automatic in its action, but leaves nothing to chance, for all parts of the carton are manipulated positively. The component elements of the machine are comparatively simple in form and hence may be made of rugged proportions which renders the machine durable as well as positive acting.

Having thus described my invention what I claim as new and desire to secure by Letters Patent, is:

1. In a machine for setting up cartons, the combination of a member adapted to enter one end of the carton and means for moving said member both upward and sidewise for swinging the top of the carton into position above the bottom of the carton.

2. In a machine for setting up cartons, the combination of a pair of coöperating members adapted to enter one end of the carton, one of said members being adapted to engage the bottom of the carton and the other adapted to engage the top of the carton, and means for swinging the last mentioned member upward and sidewise for squaring the carton.

3. In a machine for setting up cartons, the combination of an operating table, two squaring plates adapted to enter one end of the carton, said plates being arranged one above the other, the lower plate being adapted to hold the bottom of the carton down on the operating table and the upper plate being adapted to move sidewise after it has entered the carton for squaring the latter.

4. In a machine for setting up cartons, the combination of an operating table, a bottom squaring plate adapted to enter one end of the carton and hold the bottom of it down in contact with the operating table, an upper squaring plate lying on top of the bottom squaring plate, but laterally offset, and means for causing the upper plate to rise and simultaneously move laterally to a position directly above the bottom plate for squaring the carton.

5. In a machine for setting up cartons, the combination of a squaring plate adapted to enter one end of the carton, and parallel movement mechanism for moving said plate upward and sidewise and at the same time compelling it to maintain a position parallel to its original position.

6. A structure as specified in claim 5 in which the parallel movement mechanism includes a pair of pivoted links of equal length, one end of each link having a stationary pivot and the other end of each link being pivotally connected to said squaring plate.

7. In a machine for setting up cartons, the combination of a squaring plate adapted to enter one end of the carton, means for guiding said squaring plate upward and simultaneously sidewise for squaring the carton, a lever for actuating said plate to produce said upward and sidewise movement, a cam for actuating said lever, and means for producing relative movement between said cam and said lever.

8. In a machine for setting up cartons, the combination of a pair of squaring plates, one adapted to engage the bottom of the carton and the other the inside of the top thereof, means for advancing said plates to cause them to enter the end of the carton, a lever connected to and traveling forward with the upper squaring plate for moving the latter upward and sidewise at the same time that it moves forward, and a stationary cam adapted to actuate said lever as it travels.

9. In a machine for setting up cartons, the combination of an operating table, means for pushing a flat carton sidewise onto said table, means for squaring the said carton, a pair of stationary members rising from the operating table for holding the square carton between them while the end flaps are being infolded, and means for pushing the carton from its first position on the table to a position between said members.

10. In a machine for setting up cartons, the combination of an operating table, means for pushing a flat carton sidewise onto said table, a squaring plate adapted to enter the rear end of the carton, means for moving said squaring plate upward and sidewise for squaring the carton, holding members for engaging the sides of the carton after it has been squared to steady it while the end flaps are being infolded, and a pusher for advancing the carton into a position between said holding members.

11. A structure as specified in claim 10 in which the squaring plate is fastened to the pusher.

12. In a machine for setting up cartons, means for holding the carton, and two coöperating elements adapted to move transversely to the carton and adapted to engage the end flap between them for bending it along a transverse line intermediate the ends thereof.

13. In a machine for setting up cartons, an anvil for supporting the end flap of the carton between its ends, and a cam coöperating with said anvil for bending the outer section of the end flap around said anvil.

14. In a machine for setting up cartons, means for holding the carton, an anvil movable transversely to the carton and adapted to support the end flap thereof at a point between its ends, and a cam adapted to engage the outer section of the end flap to bend it around said anvil.

15. In a machine for setting up cartons, means for holding the carton, and a cam wheel rotating in a plate at right angles to the plane of the carton, said cam wheel having a concentric element adapted to support the end flap of the carton between its ends and a cam adapted to engage the end flap near the end for bending it around said concentric element.

16. In a machine for setting up cartons, means for holding the squared carton, and a grooved cam movable transversely thereto and adapted to receive the end flap of the carton for tucking it in.

17. In a machine for setting up cartons, means for holding the squared carton, means for breaking the end flap of the carton along a transverse line between the ends thereof, and a grooved cam adapted to receive the broken end flap for tucking it into the end of the carton.

18. In a machine for setting up cartons, an operating table, means for holding the squared carton thereon, a wheel rotating in a vertical plane transverse to the operating table and having an anvil for supporting the end flap of the carton between its ends, said wheel having a cam coöperating with said anvil for bending the end flap around it, and a grooved tucking cam adapted to receive the bent end flap prior to its disengagement from the first mentioned cam.

19. In a machine for setting up cartons, means for infolding the end flap of the carton, and a cam adapted to slide across the end flap transversely to the carton for finally positioning said end flap, said cam being in the form of a leaf spring whereby it is yieldable.

20. In a machine for setting up cartons, an ejector dog having a nose adapted to rest upon the top of the carton, means for retracting the dog to permit the nose to drop down over the rear edge of the carton for engaging it, said means being also adapted to thereupon move the dog forward for ejecting the carton.

21. In a machine for setting up cartons, the combination of means for squaring the carton, means for infolding the side and end flaps thereof, and a reciprocating dog traveling lengthwise of the carton, said dog having a cam shaped nose adapted to cause it to ascend to the top of the carton and override the same when traveling in the backward direction and the dog having a tooth adapted to engage the rear edge of the top of the carton when moving in the forward direction for ejecting the carton.

22. In a machine for setting up cartons, an operating table having two operating stations one in line with the other considered longitudinally of the carton, squaring means operative at the first operating station for squaring the carton, means for advancing the squared carton longitudinally to the second operating station, and means operative at the second station for infolding the side and end flaps of the carton.

23. In a machine for setting up cartons, an operating table having two operating stations, squaring means operative at the first operating station for squaring the carton, means for advancing the squared carton to the second operating station, and means operative at the second station for infolding the side and end flaps of the carton, the squaring means including two plates movable vertically with respect to each other.

24. In a machine for setting up cartons, an operating table having two operating stations, squaring means operative at the first operating station for squaring the carton, means for advancing the squared carton to the second operating station, and means operative at the second station for infolding the side and end flaps of the carton, the squaring means including two plates movable both vertically and transversely with respect to each other, the means for advancing the squared carton forming the support for one of the plates.

25. In a machine for setting up cartons, an operating table having two operating stations in line with each other, lengthwise of the carton, squaring means adapted to engage the carton when the latter is in the first operating station for squaring it, a pusher for advancing the carton longitudinally from the first operating station to the second operating station, and means operative at the second operating station for infolding the side and end flaps of the carton, said pusher being adapted to back up the carton during the action of the infolding means.

26. A structure as specified in claim 25 in which two guide members are located at the sides of the table at the second operating station for preventing sidewise movement of the carton during the infolding operation.

27. In a machine for setting up cartons, a plate adapted to be inserted from the rear end of the carton for holding down the bottom thereof, means for squaring the carton, and a grooved cam adapted to engage the end flap at the forward end of the carton for infolding it, said cam having a lip adapted to overlie the forward edge of the plate to thereby insure the entrance of the outer edge of the end flap into the carton (see Fig. 14).

28. A structure as specified in claim 27 in which the grooved cam rotates in a plane perpendicular to the length of the carton.

29. A structure as specified in claim 27 in which the means for squaring the carton consists principally of a second plate initially in contact with the first mentioned plate, said second plate being adapted to move both vertically and laterally for squaring the carton.

30. In a machine for setting up cartons, an operating table, means for squaring the carton, said means including a bottom plate adapted to be inserted into the rear end of the carton for holding the bottom of it down during the squaring operation, and a finger adapted to engage the rear end flap of the carton and hold it slantingly downward to make certain that the forward edge of the bottom plate will override said end flap as it enters the carton.

In witness whereof, I have hereunto subscribed my name.

DOMINIK M. BERNOTOW.